United States Patent
Kermaidic et al.

(10) Patent No.: US 10,330,260 B2
(45) Date of Patent: Jun. 25, 2019

(54) METHOD AND SYSTEM FOR FILLING THERMALLY INSULATED CONTAINERS WITH LIQUID CARBON DIOXIDE

(71) Applicant: YARA INTERNATIONAL ASA, Oslo (NO)

(72) Inventors: Jérôme Kermaidic, Vulaines sur Seine (FR); Nathalie Brixy, München (DE)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 262 days.

(21) Appl. No.: 15/107,650

(22) PCT Filed: Dec. 5, 2014

(86) PCT No.: PCT/EP2014/076766
§ 371 (c)(1),
(2) Date: Jun. 23, 2016

(87) PCT Pub. No.: WO2015/082704
PCT Pub. Date: Jun. 11, 2015

(65) Prior Publication Data
US 2016/0334062 A1    Nov. 17, 2016

(30) Foreign Application Priority Data

Dec. 5, 2013 (EP) .................................... 13195836

(51) Int. Cl.
*F17C 6/00* (2006.01)
*F17C 9/02* (2006.01)
(Continued)

(52) U.S. Cl.
CPC ................. *F17C 6/00* (2013.01); *F17C 3/02* (2013.01); *F17C 9/02* (2013.01); *F17C 13/023* (2013.01);
(Continued)

(58) Field of Classification Search
CPC .............. F17C 13/023; F17C 2221/013; F17C 2250/0615; F17C 6/00; F17C 2205/054
See application file for complete search history.

(56) References Cited

U.S. PATENT DOCUMENTS 1,770,944 A    7/1930 Payson
3,063,258 A * 11/1962 Szachnitowski ........ F25D 3/125
62/309

(Continued)

FOREIGN PATENT DOCUMENTS

DE    101 29 217    1/2003
EP    0 854 334    7/1998
(Continued)

OTHER PUBLICATIONS

International Search Report dated Apr. 2, 2015 in International (PCT) Application No. PCT/EP2014/076766.

(Continued)

*Primary Examiner* — Timothy L Maust
*Assistant Examiner* — Timothy P. Kelly
(74) *Attorney, Agent, or Firm* — Wenderoth, Lind & Ponack, L.L.P.

(57) ABSTRACT

A method, as well as a system, are disclosed for filling a container with an amount of liquid carbon dioxide ($CO_2$) which is partially converted into an amount of solid $CO_2$ in the container, for maintaining one or more products, loaded into the container, at a defined temperature, below a defined temperature, or within a defined temperature range, the defined temperature or the defined temperature range being below an environmental temperature. Also disclosed are a method and a system for providing identification and traceability data determining the container and the one or more (Continued)

products that have been loaded into the container, and for enabling identification of the container during transport to a particular destination.

19 Claims, 2 Drawing Sheets

(51) Int. Cl.
*F17C 13/02* (2006.01)
*F25D 3/12* (2006.01)
*F17C 3/02* (2006.01)
*G01G 17/04* (2006.01)
*G06K 7/14* (2006.01)
*G06K 19/06* (2006.01)

(52) U.S. Cl.
CPC ............ *F25D 3/125* (2013.01); *G01G 17/04* (2013.01); *G06K 7/1413* (2013.01); *G06K 19/06028* (2013.01); *F17C 2203/03* (2013.01); *F17C 2205/013* (2013.01); *F17C 2205/0157* (2013.01); *F17C 2205/0376* (2013.01); *F17C 2205/054* (2013.01); *F17C 2221/013* (2013.01); *F17C 2223/0161* (2013.01); *F17C 2223/033* (2013.01); *F17C 2225/0184* (2013.01); *F17C 2225/033* (2013.01); *F17C 2225/035* (2013.01); *F17C 2227/0337* (2013.01); *F17C 2227/0369* (2013.01); *F17C 2250/0421* (2013.01); *F17C 2250/0615* (2013.01); *F17C 2260/024* (2013.01); *F17C 2270/05* (2013.01)

(56) References Cited

U.S. PATENT DOCUMENTS

| 3,464,509 | A | * | 9/1969 | Gray | .................... G01G 5/003 |
| | | | | | 177/208 |
| 3,667,242 | A | | 6/1972 | Kilburn | |
| 4,127,008 | A | | 11/1978 | Tyree, Jr. | |
| 4,206,616 | A | | 6/1980 | Frank et al. | |
| 4,211,085 | A | | 7/1980 | Tyree, Jr. | |
| 4,821,914 | A | | 4/1989 | Owen et al. | |
| 4,916,922 | A | | 4/1990 | Mullens | |
| 5,511,379 | A | | 4/1996 | Gibot et al. | |
| 5,548,974 | A | | 8/1996 | Rhoades | |
| 5,993,165 | A | | 11/1999 | Lorimer et al. | |
| 6,044,650 | A | | 4/2000 | Cook et al. | |
| 6,119,465 | A | | 9/2000 | Mullens et al. | |
| 6,209,341 | B1 | | 4/2001 | Benedetti et al. | |
| 6,209,343 | B1 | | 4/2001 | Owen | |
| 6,260,361 | B1 | * | 7/2001 | Tyree, Jr. | ................. F17C 7/00 |
| | | | | | 62/54.1 |
| 6,467,642 | B2 | | 10/2002 | Mullens et al. | |
| 6,584,802 | B1 | | 7/2003 | Cofield et al. | |
| 7,226,552 | B2 | | 6/2007 | Manini et al. | |
| 7,275,395 | B1 | | 10/2007 | Ventura | |
| 7,310,967 | B2 | | 12/2007 | Aragon | |
| 2006/0045754 | A1 | | 3/2006 | Lukens | |
| 2008/0083763 | A1 | | 4/2008 | Nielsen | |
| 2010/0299278 | A1 | | 11/2010 | Kriss et al. | |
| 2011/0140850 | A1 | * | 6/2011 | Wassel | ................. F17C 13/021 |
| | | | | | 340/8.1 |
| 2016/0260161 | A1 | | 9/2016 | Atchley et al. | |
| 2018/0010839 | A1 | * | 1/2018 | Zhou | .................... A01N 1/0257 |

FOREIGN PATENT DOCUMENTS

| EP | 3 032 195 | 6/2016 |
| FR | 2 765 366 | 12/1998 |
| GB | 763345 | 12/1956 |
| GB | 2 030 277 | 4/1980 |
| JP | 3029950 | 4/2000 |
| WO | 2013/002426 | 1/2013 |
| WO | 2014/006281 | 1/2014 |
| WO | 2015/082704 | 6/2015 |

OTHER PUBLICATIONS

Written Opinion of the International Searching Authority dated Apr. 2, 2016 in International (PCT) Application No. PCT/EP2014/076766.

* cited by examiner

METHOD AND SYSTEM FOR FILLING THERMALLY INSULATED CONTAINERS WITH LIQUID CARBON DIOXIDE

FIELD OF THE INVENTION

The present invention relates to a method, as well as a system, for filling a container with an amount of liquid carbon dioxide ($CO_2$) which is partially converted into an amount of solid $CO_2$ into said container, for the purpose of maintaining one or more products, loaded into said container, at a defined temperature, below a defined temperature, or within a defined temperature range, which temperature or temperature range is below environmental temperature. The invention further relates to a method and a system for providing identification and traceability data determining the container and its loaded one or more products, and for enabling the identification of said container during transport to a particular destination.

BACKGROUND

In the field of maintaining goods at a defined temperature which is below environmental temperature, in particular for maintaining goods so as to be cold or frozen, especially during transport, several different solutions have been proposed in the prior art. Some of these comprise the use of vehicles with integrated freezers or refrigerators. Other solutions are based on the use of thermally insulated containers, supplied with solid $CO_2$, as is the case in the present invention.

EP1326046 B1 (Yara International ASA) discloses a multi-coupling system for filling containers, in particular thermally insulated containers, to be supplied with a cryogenic medium such as solid $CO_2$ (commonly known as dry ice), with liquid $CO_2$, injected from a liquid source, and which is converted into solid $CO_2$ upon injection. Typically, a specifically dedicated inner part of such thermally insulated containers comprises a compartment or cell that is dedicated to contain the cryogenic medium, e.g., solid $CO_2$, by separating it from the product transported inside the thermally insulated container.

The amount of solid $CO_2$ to be supplied to a container is typically calculated based on the required residence time of the loaded one or more products to be maintained at a defined temperature, below a defined temperature, or within a defined temperature range, which temperature or temperature range is below environmental temperature. Consequently, the residence time is the time the one or more loaded products are to be maintained in the container at a defined temperature, below a defined temperature, or within a defined temperature range, which temperature or temperature range is below environmental temperature, e.g., during transport of the container. Typical residence times are 12 hours up to 3 days (i.e., over a weekend, from a Friday morning until a Monday morning), or even longer.

When performing the filling of the container with $CO_2$, in the prior art, it is mentioned that the amount of solid $CO_2$ to be generated is based on the duration of the injection of the liquid $CO_2$. This is a fairly inaccurate method. When the liquid $CO_2$, which is stored in a refrigerated form, expands into the cold cell located in the container, this cold cell being specially developed for this purpose, approximately 50-60% of the injected quantity becomes dry ice and approximately 40-50% becomes gaseous $CO_2$, depending on the pressure within this cold cell. The gaseous $CO_2$ produced on injection, i.e., 40-50% of the total injected quantity, is extracted via suitable devices in order to prevent an impermissible concentration of the $CO_2$ in the atmosphere of the working premises.

Therefore, the prior art method of determining the amount of solid $CO_2$ that is actually supplied to a container upon injection of liquid $CO_2$ will give rise to large uncertainties due to, for example, pressure and temperature variations during the filling operation.

As soon as the desired quantity of liquid $CO_2$ is injected into the cooling container, the $CO_2$ filling process is automatically stopped by a timer in control thereof.

Furthermore, the prior art method will not provide identification and traceability of relevant data for a container filled with $CO_2$.

Consequently, there exists the need to provide a more accurate way of supplying an amount of solid $CO_2$ to a thermally insulated container.

SUMMARY OF THE INVENTION

The present invention relates to a method for filling a compartment in an inner part of a container with an amount of liquid $CO_2$ which is partially converted into an amount of solid $CO_2$ upon injection of the liquid $CO_2$ into said compartment, said container being designed to contain one or more products loaded into it, wherein said products are to be maintained at a defined temperature, below a defined temperature, or within a defined temperature range, which temperature or temperature range is below environmental temperature, using said solid $CO_2$, wherein said container is subjected to a weighing operation using weighing means resulting into a weight of said container, wherein said weight of said container, is determined by said weighing means at least before and after said container has been supplied with said amount of converted solid $CO_2$.

Further, in another aspect there is provided a method for filling a container with an amount of liquid $CO_2$ which is partially converted into an amount of solid $CO_2$ in said container, for the purpose of maintaining one or more products, loaded into said container, at a defined temperature, below a defined temperature, or within a defined temperature range, which temperature or temperature range is below environmental temperature, wherein said container, optionally loaded with one or more products, is subjected to a weighing operation using weighing means resulting into a weight of said container, wherein said weight of said container, optionally loaded with one or more products, is determined by said weighing means at least before and after said container has been supplied with said amount of converted solid $CO_2$.

The inventive method according to the invention will contribute to increased accuracy of the determination of the amount of solid $CO_2$ supplied to the container, compared to prior art methods and systems. This leads to less $CO_2$ consumption, and hence to a lower carbon dioxide footprint.

Furthermore, because of a weighing operation, in case of an emergency situation like a power failure, the filling process does not need to be restarted as is the case in prior art systems, as the data on the amount of liquid $CO_2$ already filled before the power failure, is not lost.

According to one embodiment, the method comprises the following steps:
  (a) determining the weight of said container, using weighing means;
  (b) generating barcode data by scanning a barcode, provided with the container;

(c) calculating the weight of the amount of converted solid $CO_2$ to be supplied to the compartment in the inner part of said container, based on said barcode data, generated in step (b);

(d) filling said container with an amount of liquid $CO_2$, thereby monitoring the weight of the container, until the weight of the container is equal to the weight of the container, as determined in step (a), increased by the weight of the amount of converted solid $CO_2$, as calculated in step (c);

(e) storing in a database, the barcode data, obtained in step (b); and (f) storing in said database, data on the weight of the amount of converted solid $CO_2$, supplied to said container, as determined in step (c).

Particularly, the invention relates to a method for filling a container with an amount of liquid $CO_2$ which is partially converted into an amount of solid $CO_2$ in said container, for the purpose of maintaining one or more products, loaded into said container, at a defined temperature, below a defined temperature, or within a defined temperature range, which temperature or temperature range is below environmental temperature, comprising the following steps:

(a) determining the weight of a container, optionally loaded with one or more products, using weighing means, in particular by placing the container, optionally loaded with one or more products, on a weighbridge;

(b) generating barcode data by scanning a barcode, provided with the container, said barcode data describing, for example, the type of said container, the type of said loaded one or more products, the required residence time of the one or more products in said container and the destination of said container;

(c) calculating the weight of the amount of solid $CO_2$ to be supplied to the container, based on said barcode data, generated in step (b), in particular based on the required temperature of said container, the nature of said loaded one or more products and the required residence time of said loaded one or more products;

(d) filling said container with an amount of liquid $CO_2$, thereby monitoring the weight of the container, until the weight of the container is equal to the weight of the container, as determined in step (a), increased by the weight of the amount of solid $CO_2$, as calculated in step (c);

(e) storing in said database, said barcode data, obtained in step (b); and (f) storing in said database, data on the weight of the amount of solid $CO_2$ supplied to said container, as obtained in step (d).

This method will also provide identification and traceability data determining the container and its loaded one or more products that will enable the identification of said container during transport to a particular destination and that will enable reviewing its history and building statistical data for later review.

According to one embodiment, the container is a thermally insulated container.

According to one embodiment, the container may be empty or may already be loaded with one or more products, when subjecting the container to the method according to the invention.

According to one embodiment, data on the weight of the amount of solid $CO_2$, supplied to said container, comprise the weight of the amount of liquid $CO_2$, injected into said container, the weight of the amount of solid $CO_2$, and the date and time of the filling operation.

Furthermore, it should be noted that the order of the method steps, as recited above, may be executed in any order, as long as step (c) follows after step (b), step (d) follows after step (a) and step (c), step (e) follows after step (b), and step (f) follows after step (d). With the wording "follows after", it is meant that a step A is executed after a step B, either immediately after, or with one or more intervening step.

The invention is also related to a system for performing the inventive method as described above.

The invention concerns a system for filling a compartment in an inner part of a container with an amount of liquid $CO_2$, which is partially converted into an amount of solid $CO_2$ upon injection of the liquid $CO_2$ into said compartment, said container being designed to contain one or more products loaded into it, wherein said products are to be maintained at a defined temperature, below a defined temperature, or within a defined temperature range, which temperature or temperature range is below environmental temperature, using said solid $CO_2$, wherein said system comprises weighing means for subjecting said container to a weighing operation resulting into a weight of said container at least before and after said inner part of said container has been supplied with said amount of converted solid $CO_2$.

In one embodiment, the system comprises:

weighing means, capable of determining the weight of said container;

a barcode scanner, capable of scanning a barcode, provided with said container for generating barcode data;

calculating means, capable of calculating the weight of the amount of converted solid $CO_2$ to be supplied to said compartment in the inner part of the container, based on said barcode data; and filling means, capable of filling said compartment in the inner part of said container with an amount of liquid $CO_2$ which is at least partially converted into solid $CO_2$ upon injection of the liquid $CO_2$ into said compartment, thereby monitoring the weight of the container, until the weight of the container is equal to the weight of the container as previously determined, increased by the weight of the calculated amount of converted solid $CO_2$; and a database, capable of storing said barcode data, and data on the weight of the amount of converted solid $CO_2$, supplied to said compartment in the inner part of said container.

DETAILED DESCRIPTION OF THE INVENTION

The invention will now be described in detail with reference to the drawings.

A particular purpose of the present invention is maintaining goods so as to be cold or frozen for a specific period of time. Goods to be kept cold or frozen can be different types of products like, for instance, food, pharmaceutical products and biological products. Such products will typically have an expiration date, and must be kept at a specific low temperature prior to said expiration date. In order to comply with this requirement during loading from a facility, as well as shipping and transport to a destination, the products are stored in a compartment 101 of a thermally insulated container 100, supplied with a specific amount of solid $CO_2$. According to the invention, the injected amount of liquid $CO_2$ is weighted in order to increase the accuracy of the determination of the amount of solid $CO_2$ and to avoid the disadvantages in the filling process, known from prior art systems.

Another purpose of the invention is enabling identification and traceability of a container 100 during transport to a destination, together with the amount of $CO_2$ filled.

Figure 1:
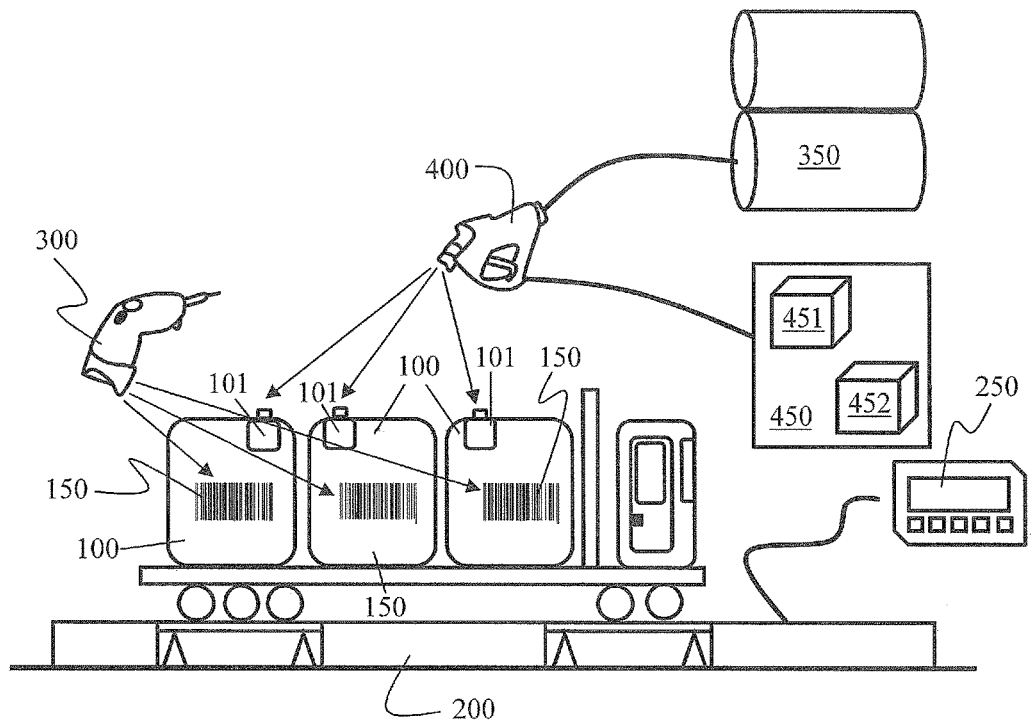
FIG. 1 shows an example of a setup used for performing the method according to the invention.

FIG. 1 shows an embodiment of a setup, used for performing the inventive method for filling a compartment 101 of a thermally insulated container 100 with a specific amount of $CO_2$ for the purpose of maintaining its content so as to be frozen or cold.

For performing the method, the system comprises a thermally insulated container 100 with an inner compartment 101 (in FIG. 1, several containers 100 are shown), a weighing scale 200 generating weighing data, weight display means 250 for displaying said weighing data, a barcode scanner 300 for scanning a barcode 150 related to one or more containers 100 and generating barcode data, control means 450 comprising a database 451 for storing said barcode data and weighing data, as well as calculation means 452 for calculating the weight of the amount of solid $CO_2$ to be supplied, and a filling gun 400, connected to a supply of liquid $CO_2$ 350 for filling liquid $CO_2$ into each container 100.

The weighing scale 200 is connected to the weight display means 250 which in turn is connected to the database 451. The connection can be wired or wireless by known means and protocols, e.g., Ethernet, WiFi, HTTPS, RS232, GSM, FTP, etc.

When filling a container with liquid $CO_2$, a filling gun 400, connected to a supply of liquid $CO_2$, is attached to the container 100. The filling gun 400 is connected to the control means 450 for controlling the amount of liquid $CO_2$ to be filled, based on calculated and measured weight of solid $CO_2$. The control means 450 is a computer controlling opening and closing of a valve in the filling gun 400. The amount of liquid $CO_2$ to be filled in each container 100 is thus based on the calculated weight of solid $CO_2$ to be supplied to the respective container 100 and measured weight of the container 100 that is being filled with liquid $CO_2$ that at least partially converts into solid $CO_2$ when in this container 100.

The functions and operations of the different devices comprised in the system will now be further described with reference to the inventive method.

The inventive method comprises several steps to be performed. The method is typically performed when an order is received regarding products to be transported from a storage or production facility to a specific destination, e.g., a store or a shop.

The first step in the method is embodied by placing a container 100 on a weighing scale 200. The number of containers 100 placed on the weighing scale 200 can range from 1 to 4, and will typically be 3 to 4 containers 100. Prior to placing a container 100 on the weighing scale 200, they may be loaded with goods or products.

In one embodiment, the type of weighing means 200 used is a weighbridge, as shown in FIG. 1. In another embodiment, the weighing means 200 is a wheel weight (not shown in the figures). In yet another embodiment, the weighing means is a suspended spring weight (not shown in the figures). The type of weighing means 200 used will depend on the specific requirement or setup at the loading facility.

Each container 100 to be shipped is provided with a barcode 150 describing at least the type of container 100, the type of loaded one or more products, the required residence time of the one or more products in said container, and the destination of the container 100.

The next step in the method is scanning each barcode 150 of the at least one thermally insulated container 100 by means of a barcode scanner 300 and thereby generating barcode data.

The generated barcode data is transferred and stored in a database 451. The barcode data is transferred to the database 451 via known means, i.e., via cable or wireless. In one embodiment of the invention, the database 451 is accessible through a dedicated secured interface, e.g., a secured Internet website.

The scanning of a barcode of a container 100 can be performed in the loading process of loading a container 100 onto the weighing scale 200 or after a container 100 has been loaded on the weighing scale 200 and the weight of the container 100 has been determined. Hence the steps of (a) determining the weight of a container 100, optionally loaded with one or more products, using weighing means 200; and (b) generating barcode data by scanning a barcode 150, provided with the container 100, are interchangeable and/or are interchanged.

The next step in the inventive method is calculating the amount of $CO_2$ to be filled in the container 100 based on the barcode data, for example, on the temperature to be maintained in each container 100 during the time of transportation to its destination, i.e. the loading time of the products. The total amount of the liquid $CO_2$ to be filled is based on the total weight of solid $CO_2$ to be supplied to a container 100 for maintaining its content at a defined temperature, below a defined temperature, or within a defined temperature range, which temperature or temperature range is below environmental temperature during the whole transportation period.

In addition to the transportation time, another input parameter in the calculation of the amount of $CO_2$ is the environmental temperature of the surroundings where the container will be located during transport.

The thermodynamic principle used will now be explained, wherein:

| formula | | Q = | $k * S * \Delta T * t * \alpha =$ | | $m * L$ |
|---|---|---|---|---|---|
| heat quantity | | | Q | | J |
| heat exchange overall coefficient | | | k | | W/m2 · K |
| surface | | | S | | m2 |
| temperature difference | | | $\Delta T = \theta ext - \theta int$ | | K |
| transport duration | | | t | | s |
| insulation thickness | | | e | | m |
| insulation thermal conductivity | | | λ | | W/m · K |
| CO2 values | | | | | |
| snow potential energy | | L | | 640 | kJ/kg |
| Safety coefficient | | α | | 1 to extablish during test period | |

The amount of energy Q, defined as heat quantity, is calculated in order to determine the amount of $CO_2$, necessary to compensate for this amount of energy Q, lost through the walls of a given thermally insulated container 100 during a given time, and for a given temperature difference. The amount of $CO_2$ allows a container 100 to maintain its internal temperature at a defined temperature, below a defined temperature, or within a defined temperature range.

Heat exchange overall coefficient k is a technical data given by the manufacturer of the container 100. It depends on the insulation product used (e.g., polystyrene, polyurethane, etc.). Heat exchange overall coefficient k is linked to insulation thickness and component thermal conductivity.

Surface S is the total internal surface of the thermally insulated container ($m^2$), exposed to the environmental temperature.

$\Delta T$ is the difference between the environmental temperature $\theta_{ext}$ and the internal temperature $\theta_{int}$. The internal temperature $\theta_{int}$ is determined by the products to be transported. Most of these product storage temperatures are determined according to established European or local directives, regulations or best practices. The environmental temperature $\theta_{ext}$ is determined by an operator each day or can be determined by a weather station, located at the site of the operator, e.g., NETATMO weather station. Hence, according to one embodiment, the environmental temperature can be based on a temperature measurement or can be any temperature value, determined by an operator. It is worth noting that solid $CO_2$ (dry ice) has a temperature of $-109.3°$ F. ($-78.5°$ C.) at 1 atmosphere. Hence, the internal temperature can never be set lower than said temperature.

The environmental temperature can be modified by an operator with an "adjustment factor" representing a percentage between early morning and afternoon seasonal average variation. Usually, containers 100 for holding goods are prepared early in the morning and are transported within the following day, depending on the distance between the preparation area and the delivery point. The environmental temperature will typically be higher in the middle of the afternoon. Said "adjustment factor" will thus add a standard percentage to the early morning environmental temperature. For instance, if the environmental temperature early in the morning is 22° C., an adjustment factor of +30% means that the maximal environmental temperature of the day will be around 28.6° C. Using the system of FIG. 3, an operator can also use + or − signs (see FIG. 3) to increase or decrease the adjustment factor with his weather knowledge.

Hence, in one embodiment of the method according to the invention, the environmental temperature is based on a temperature measurement, adjusted with an adjustment factor.

In yet another embodiment, the environmental temperature used for calculation is manually set, for example, by an operator. A scenario where this is relevant is when the difference between the selected environmental temperature and the measured environmental temperature is too high, i.e., greater than a set level. The set level may, for instance, be 5° C. If this is the case, an alarm will be triggered, or notification will be given via the control screen (see FIG. 3). An operator can then manually change the value of the temperature to be used in the calculation of the amount of $CO_2$.

Time t is determined by a guarantee of a total transport time (for instance, 48 hours) or a guarantee until an arrival time (for example, the products are prepared on day A and, for instance, delivery is planned to be made on day B at 13:00).

Usually, a safety coefficient $\alpha$ is further added to adjust the thermodynamic formula to take into account, for instance, the aging of the thermally insulated containers. This safety coefficient is adapted on a container-by-container basis, for instance, based on the operators' knowledge and/or the results of a quality campaign.

When the temperature to be used in the calculation is determined, the calculation of the amount of $CO_2$ based on the weight of the container 100, optionally loaded with one or more products, will be done. The calculation itself is based on a well-known thermodynamic calculation and further details will not be described here.

After the amount of the solid $CO_2$, to be supplied to a container 100, has been calculated, the next step in the method is filling said container 100 with an amount of liquid $CO_2$, thereby monitoring the weight of the container, optionally loaded with one or more products, until the weight of the container 100 is equal to the weight of the container 100, as determined by weighing using said weighing means 200, increased by the weight of the calculated amount of solid $CO_2$. Filling will start once the filling gun 400 has been connected to a container 100 and will stop once the calculated weight of the $CO_2$ for that container 100 has been reached.

If the filling fails due to, for instance, an emergency stop, e.g., a filling gun 400 off hook signal or a too high level of $CO_2$ in the area, the system will remember the last weight value and an operator can restart the filling process to reach the calculated amount of solid $CO_2$, starting from said last weight value. This is a big advantage compared to filling methods known from the prior art in which filling will be halted.

Prior to filling each container 100, the weight can be reset. Hence, the weight of the container 100, optionally loaded with one or more products, is monitored until the weight of the container 100 is equal to the weight of the container, as determined by weighing (but reset to zero), increased by the weight of the calculated amount of solid $CO_2$.

The weight of the amount of solid $CO_2$ supplied to a container 100, as well as the date and time of filling/weighing is registered into said database 451 together with its barcode data. The weight of each container 100 will then be traceable together with the other barcode data for each container 100.

Figure 2:
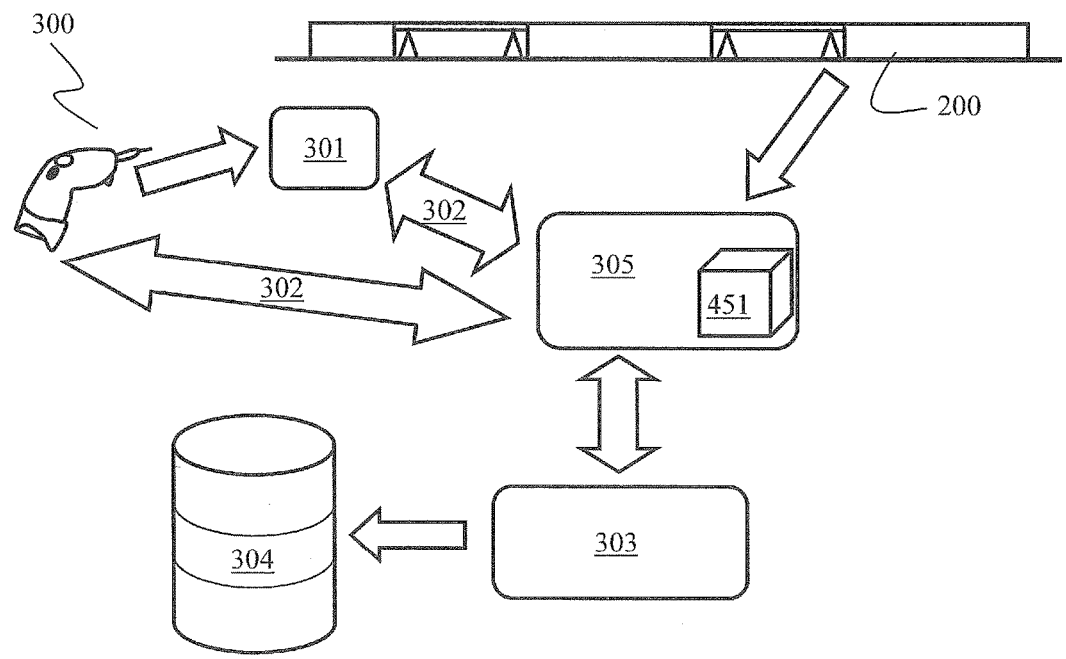
FIG. 2 shows an overview of the different components comprised in the system according to the invention for enabling registration of traceable data.

FIG. 2 shows an overview of the different components that may be comprised in the system for providing identification and traceability data, determining the container 100 and its loaded one or more products, and for enabling the identification of said container 100 during transport to a particular destination.

FIG. 2 illustrates the principle enabling full traceability for both the supplier and the customer of the loaded products. The main component in this set-up is the dosing system 305 where all relevant data regarding registered/scanned containers 100 are stored in a database 451.

The main inputs to the system comprising the database 451 are barcode data, generated by the barcode reader 300, and weight data, measured by the weighing scale 200. In one embodiment, the generated barcode data is transmitted from a barcode scanner 300 with a built-in wireless transmitter 301. In another embodiment, scanned data is sent from the barcode scanner 300 with wired means and interface 302, e.g., RS232.

All data 303 identifying a container 100, are traceable from an external server 304. Customers may log on to the database 451 for tracing relevant parameters for their containers 100 with ordered products.

Figure 3:
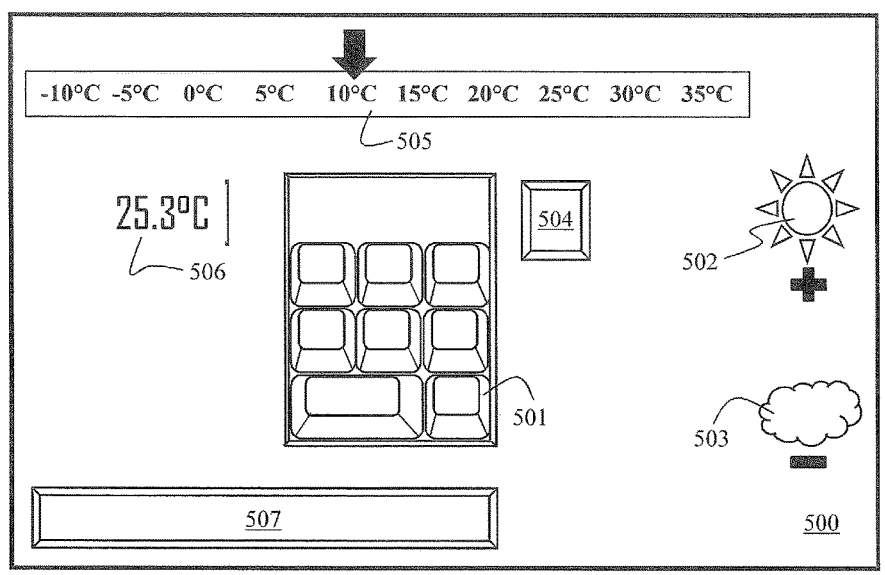
FIG. 3 shows an example of a control panel used for controlling the filling process according to the invention.

FIG. 3 shows an example of a control panel 500 used for controlling the system and the filling process. The panel is located at the loading facility of the thermally insulated containers 100.

As mentioned above, the system can be operated automatically, based on direct environmental temperature data (shown on display 506), or an operator can manually override the environmental temperature, used in the calculation of the amount of solid $CO_2$ to be supplied to each cabinet.

The type of container 100 used, the type of product transported, the desired temperature 505 inside the container 100, and the time period for maintaining a product so as to be frozen or cold, can be selected from different default programs 507. By inputting a code on a number pad 501, an operator can select such a specific program. The control panel can also be used for making tailor-made programs for specific needs.

By pressing the sun sign (502, right upper area), the temperature used in the calculations will increase, and by pressing the cloud sign (503, right upper area), the temperature will decrease. Relevant selected information will be displayed on a display panel 504.

The following describes an example of a typical user scenario when using the system and method according to the present invention. An operator of the system receives an order for a product and loads one or more containers 100 with the ordered product. This may, for instance, be frozen fish to be transported to a food shop at a distance with a travel time of 6 hours (the residence time is at least equal to the travel time). The specific food shop may or may not already be registered in the system, for example, after having placed a previous order. If it is already registered, returned containers 100 used in a previous shipment, are already provided with barcodes 150 identifying the products and the customer. If it is not registered, new barcodes 150 will be generated with relevant information. According to one embodiment, the barcode data comprises at least data such as the type of container 100, the type of loaded one or more products, the required residence time of the one or more products in said container 100, and the destination of the container 100. Furthermore, it may contain data identifying the customer.

The type of container 100 used, the time to maintaining a product so as to be frozen (residence time of the one or more products), and the environmental temperature will directly influence the amount of solid $CO_2$ to be supplied to the container 100 and hence, the amount of liquid $CO_2$ to be injected into the container 100.

Each container 100 with the frozen fish is subsequently loaded onto a weighbridge 200. This operation is typically performed by means of an order picker forklift placing 3 to 4 containers 100 on the weighbridge 200. The frozen fish may also be loaded into the containers 100 after the containers 100 have been loaded onto the weighbridge 200.

The barcodes 150 on the containers 100 are scanned and the barcode data is registered in the database 451 providing online access for the customer. Based on the barcode data and the selected environmental temperature (either determined by measurement or manually set), the amount of solid $CO_2$ to be supplied to each container 100 is calculated. The weighbridge 200 may be reset before filling each container 100 such that only the weight of the solid $CO_2$ is shown.

An operator or a robot will then connect the filling gun 400 to the container 100 to be filled, and filling is performed while the amount of solid $CO_2$ is measured. When the calculated amount of $CO_2$ has been reached, as determined from the weighing operation, the control means 450 controlling the filling gun 400 will stop the filling and the actual weight of solid $CO_2$ will be registered in the database 451 together with the date and the time of filling and the relevant barcode data for the filled container 100. The same injection operation will be performed on the next container 100 until all containers 100 on the weighbridge 200 are filled.

The invention further relates to the system for performing the method as disclosed above. Furthermore, the invention relates to a system for filling a container 100 with an amount of $CO_2$, which is partially converted into an amount of solid $CO_2$ in said container, for the purpose of maintaining one or more products, loaded into said container 100, at a defined temperature, below a defined temperature, or within a defined temperature range, which temperature or temperature range is below environmental temperature, said system comprising weighing means for subjecting said container 100 to a weighing operation resulting into a weight of said container.

Moreover, the invention relates to a system for filling a container 100 with an amount of $CO_2$, which is partially converted into an amount of solid $CO_2$ in said container 100, for the purpose of maintaining one or more products, loaded into said container 100, at a defined temperature, below a defined temperature, or within a defined temperature range, which temperature or temperature range is below environmental temperature, said system comprising:
- weighing means 200, capable of determining the weight of said container 100;
- a barcode scanner, capable of scanning a barcode 150, provided with said container 100 for generating barcode data;
- calculating means, capable of calculating the weight of the amount of solid $CO_2$ to be supplied to the container 100, based on said barcode data; and
- filling means 400, capable of filling said container 100 with an amount of liquid $CO_2$ that at least partially converts into solid $CO_2$ into said container 100, thereby monitoring the weight of the container 100, until the weight of the container 100 is equal to the weight of the container previously determined, increased by the weight of the calculated amount of solid $CO_2$; and
- a database 100, capable of storing said barcode data, and data on the weight of the amount of solid $CO_2$, supplied to said container 100.

The invention claimed is:

1. A method comprising:
    filling a compartment in an inner part of a container with an amount of liquid $CO_2$ which is partially converted into an amount of solid $CO_2$ upon injection of the liquid $CO_2$ into the compartment,
    wherein the container is configured to contain one or more products and maintain the one or more products at a defined temperature, below a defined temperature, or within a defined temperature range, the defined temperature or the defined temperature range being below an environmental temperature, using the solid $CO_2$;
    (a) determining a weight of the container by subjecting the container to a weighing operation using a scale resulting in the weight of the container at least before and after the container has been supplied with the amount of converted solid $CO_2$;
    (b) generating barcode data by scanning a barcode, provided with the container;
    (c) calculating a weight of the amount of converted solid $CO_2$ to be supplied to the compartment in the inner part of the container, based on the barcode data, generated in step (b);

(d) the filling the compartment in the inner part of the container with the amount of liquid $CO_2$, and monitoring the weight of the container using the scale, until the weight of the container is equal to the weight of the container, as determined in step (a), increased by the weight of the amount of converted solid $CO_2$, as calculated in step (c);

(e) storing in a database, the barcode data, obtained in step (b); and (f) storing in the database, data on the weight of the amount of converted solid $CO_2$, supplied to the container, as determined in step (c).

2. The method according to claim 1, wherein the container is a thermally insulated container.

3. The method according to claim 1, wherein the container is loaded with the one or more products.

4. The method according to claim 1, wherein the scale is a weighbridge, a wheel weight or a suspended spring weight.

5. The method according to claim 1, wherein the barcode data comprises at least a type of the container, a type of the one or more products, a required residence time of the one or more products, and a destination of the container.

6. The method according to claim 1, wherein the data on the weight of the amount of solid $CO_2$, supplied to the container, comprise a weight of the amount of liquid $CO_2$, injected into the container, the weight of the amount of solid $CO_2$, and a date and time of the filling the compartment in the inner part of the container with the amount of liquid $CO_2$.

7. The method according to claim 1, wherein the environmental temperature which is used in calculating the weight in step (c) is based on a temperature measurement, or is any temperature value, determined by an operator.

8. The method according to claim 7, wherein the environmental temperature which is used in calculating the weight in step (c) is based on a temperature measurement, adjusted with an adjustment factor.

9. The method according to claim 1, wherein the database is accessible through a dedicated secured Internet website.

10. The method according to claim 1, wherein the method steps, as recited above, are executable in any order, as long as step (c) follows after step (b), step (d) follows after step (a) and step (c), step (e) follows after step (b), and step (f) follows after step (d).

11. A system for filling a compartment in an inner part of a container with an amount of liquid $CO_2$, which is partially converted into an amount of solid $CO_2$ upon injection of the liquid $CO_2$ into the compartment, the system comprising:

the container which is configured to contain one or more products and maintain the one or more products at a defined temperature, below a defined temperature, or within a defined temperature range, the defined temperature or the defined temperature range being below an environmental temperature, using the solid $CO_2$;

scale for subjecting the container to a weighing operation resulting in a weight of the container at least before and after the inner part of the container has been supplied with the amount of converted solid $CO_2$;

a barcode scanner, capable of scanning a barcode, provided with the container for generating barcode data;

a calculator, capable of calculating a weight of the amount of converted solid $CO_2$ to be supplied to the compartment in the inner part of the container, based on the barcode data;

a filling gun, capable of filling the compartment in the inner part of the container with the amount of liquid $CO_2$ which is at least partially converted into solid $CO_2$ upon the injection of the liquid $CO_2$ into the compartment, the weight of the container being monitored using the scale, until the weight of the container is equal to the weight of the container before the compartment in the inner part of the container has been supplied with the amount of converted solid $CO_2$, increased by the weight of the amount of converted solid $CO_2$; and a database, capable of storing the barcode data, and data on the weight of the amount of converted solid $CO_2$, supplied to the compartment in the inner part of the container.

12. The system according to claim 11, wherein the container is a thermally insulated container.

13. The system according to claim 11, wherein the scale is a weighbridge, a wheel weight or a suspended spring weight.

14. The system according to claim 11, wherein the container is loaded with the one or more products.

15. The system according to claim 11, wherein the barcode data comprises at least a type of the container, a type of the one or more products, a required residence time of the one or more products, and a destination of the container.

16. The method according to claim 1, wherein step (a) and (b) are interchangeable and/or are interchanged.

17. The system according to claim 11, wherein the environmental temperature which is used by the calculator is based on a temperature measurement, or is manually set.

18. The system according to claim 17, wherein the environmental temperature which is used by the calculator is based on a temperature measurement, adjusted with an adjustment factor.

19. The system according to claim 11, wherein the database is accessible through a dedicated secured Internet website.

* * * * *